US007268692B1

(12) United States Patent
Lieberman

(10) Patent No.: US 7,268,692 B1
(45) Date of Patent: Sep. 11, 2007

(54) APPARATUS AND METHOD FOR MONITORING HAND PROPINQUITY TO PLURAL ADJACENT ITEM LOCATIONS

(75) Inventor: Klony Lieberman, Jerusalem (IL)

(73) Assignee: Lumio Inc., Menlo Park ( * ) Notice: Subject to any disclaimer, the term of this patent is extended or adjusted under 35 U.S.C. 154(b) by 0 days.

(21) Appl. No.: 11/669,948

(22) Filed: Feb. 1, 2007

(51) Int. Cl.
*G08B 21/00* (2006.01)

(52) U.S. Cl. .................. 340/686.1; 340/555; 340/556; 340/568.1; 700/213

(58) Field of Classification Search ............. 340/686.1, 340/540, 555–557, 568.1, 572.4, 686.6, 545.6, 340/569; 359/346; 345/175; 250/221–224
See application file for complete search history.

(56) References Cited

U.S. PATENT DOCUMENTS

| | | | |
|---|---|---|---|
| 6,275,152 B1 * | 8/2001 | Speas et al. ................ 340/556 |
| 6,362,468 B1 * | 3/2002 | Murakami et al. .......... 250/221 |
| 6,570,103 B1 | 5/2003 | Saka et al. |
| 6,753,776 B2 | 6/2004 | Drinkard |
| 7,067,794 B2 | 6/2006 | Le Gallo et al. |

* cited by examiner

*Primary Examiner*—Daniel Wu
*Assistant Examiner*—Travis R. Hunnings

(57) ABSTRACT

Apparatus for monitoring hand propinquity to plural adjacent item locations arranged in a generally two-dimensional array including an illuminator, disposed adjacent a first edge of the two-dimensional array and generating radiation which illuminates a generally planar imaginary curtain disposed in front of the plural adjacent item locations, at least one detector, disposed adjacent the first edge of the array and sensing the radiation reflected from a hand traversing the imaginary curtain generally at any location on the curtain and location determination circuitry responsive to at least one output of the at least one detector for associating a sensed position of the hand with respect to one of the plural adjacent item locations.

20 Claims, 4 Drawing Sheets

APPARATUS AND METHOD FOR MONITORING HAND PROPINQUITY TO PLURAL ADJACENT ITEM LOCATIONS

FIELD OF THE INVENTION

The present invention relates to hand propinquity monitoring devices and methods generally and more particularly to error-proofing devices and methodologies.

BACKGROUND OF THE INVENTION

The following published patent documents are believed to represent the current state of the art: U.S. Pat. Nos. 6,275,152; 6,753,776; 6,362,468; 6,570,103 and 7,067,794.

SUMMARY OF THE INVENTION

The present invention seeks to provide improved hand propinquity monitoring devices and methodologies.

There is thus provided in accordance with a preferred embodiment of the present invention apparatus for monitoring hand propinquity to plural adjacent item locations arranged in a generally two-dimensional array including an illuminator, disposed adjacent a first edge of the two-dimensional array and generating radiation which illuminates a generally planar imaginary curtain disposed in front of the plural adjacent item locations, at least one detector, disposed adjacent the first edge of the array and sensing the radiation reflected from a hand traversing the imaginary curtain generally at any location on the curtain and location determination circuitry responsive to at least one output of the at least one detector for associating a sensed position of the hand with respect to one of the plural adjacent item locations.

Preferably, the apparatus also includes error notification circuitry responsive to at least one input indicating a correct one of the plural adjacent item locations to be accessed by the hand and also responsive to an output from the location determination circuitry, indicating the sensed position of the hand with respect to one of the plural adjacent item locations, for providing a sensible indication of a mismatch between the correct one of the plural adjacent item locations to be accessed by the hand and the sensed position of the hand with respect to one of the plural adjacent item locations. Additionally or alternatively, the apparatus also includes at least one item location designator providing a visually sensible indication indicating the correct one of the plural adjacent item locations to be accessed by the hand.

Preferably, the at least one detector includes at least two detectors and the location determination circuitry is operative in a triangulation mode of operation. Alternatively, the at least one detector includes a 2-dimensional CMOS camera and the location determination circuitry is operative in a confocal detection mode of operation. In another alternative embodiment, the at least one detector includes at least one photo-diode and the location determination circuitry is operative in a relative intensity position measurement mode of operation.

Preferably, the location determination circuitry is operative to provide an output indicating that the hand is in propinquity to a specific one of the plural adjacent item locations. Additionally or alternatively, the location determination circuitry is operative to calculate the coordinates of the location of the hand with respect to the at least one detector.

Preferably, the apparatus also includes at least one barrier operative to limit possible cross-talk with similar devices.

There is also provided in accordance with another preferred embodiment of the present invention a method for monitoring hand propinquity to plural adjacent item locations arranged in a generally two-dimensional array, the method including generating radiation which forms a generally planar imaginary curtain disposed in front of the plural adjacent item locations, sensing the radiation reflected from a hand traversing the imaginary curtain generally at any location on the curtain and associating a sensed position of the hand with respect to one of the plural adjacent item locations based on the sensing.

Preferably the method also includes providing at least one input indicating a correct one of the plural adjacent item locations to be accessed by the hand and providing a sensible indication of a mismatch between the correct one of the plural adjacent item locations to be accessed by the hand and the sensed position of the hand with respect to one of the plural adjacent item locations. Additionally or alternatively, the method also includes providing a visually sensible indication indicating the correct one of the plural adjacent item locations to be accessed by the hand.

Preferably, the associating includes calculating the sensed position by triangulation. Alternatively, the associating includes calculating the sensed position using confocal detection. In another alternative embodiment the associating includes calculating the sensed position using relative intensity position measurement.

Preferably, the associating includes indicating that the hand is in propinquity to a specific one of the plural adjacent item locations. Additionally or alternatively, the associating includes calculating coordinates of the location of the hand with respect to the plural adjacent item locations.

Preferably, the method also includes providing at least one barrier operative to limit possible cross-talk with similar devices.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
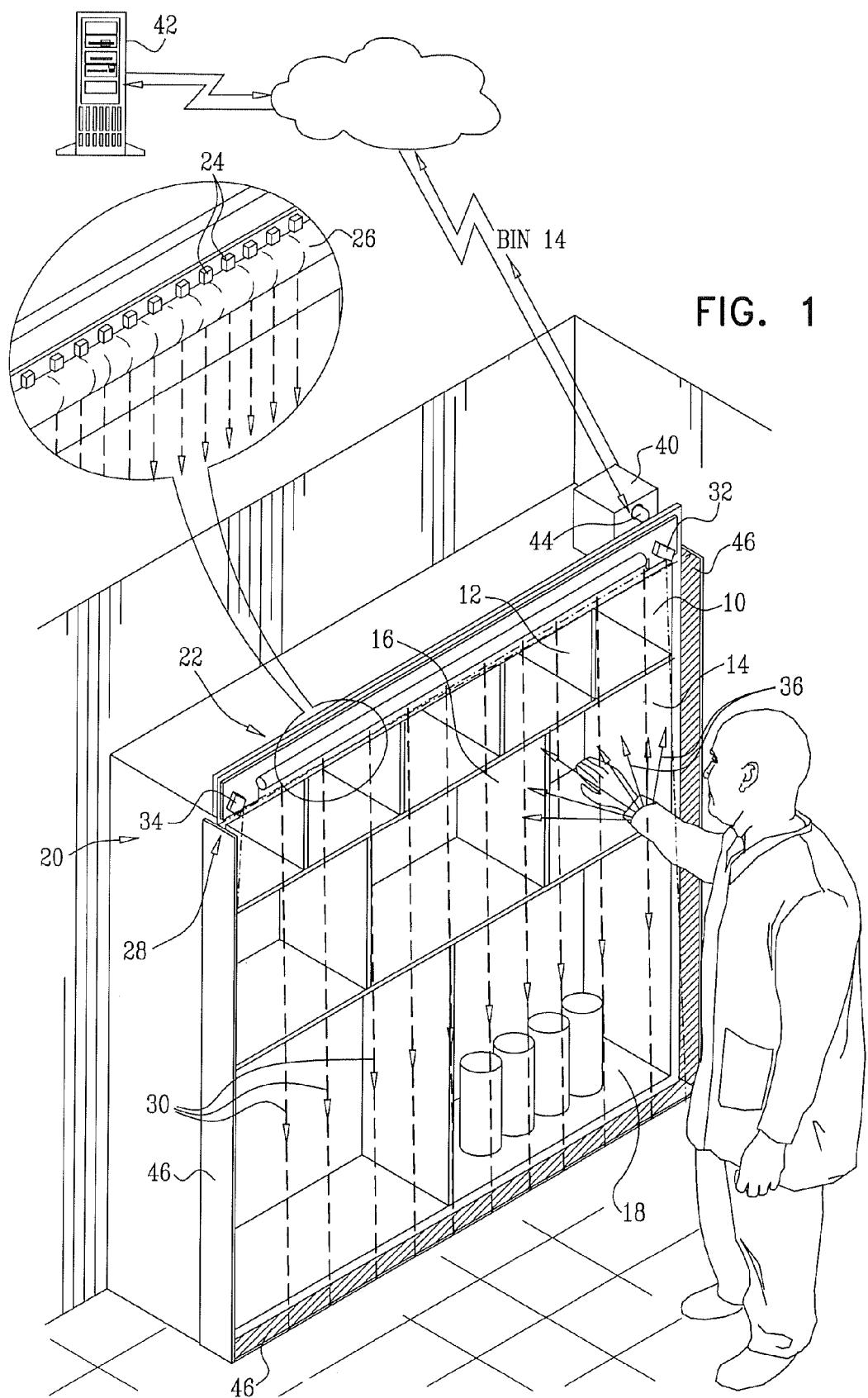
FIG. 1 is a simplified illustration of a hand propinquity monitoring device constructed and operative in accordance with a preferred embodiment of the present invention.

Reference is now made to FIG. 1, which is a simplified illustration of a hand propinquity monitoring device constructed and operative in accordance with a preferred embodiment of the present invention, particularly useful in error-proofing applications. As seen in FIG. 1, there is provided a device for monitoring hand propinquity to plural adjacent item locations, such as bins 10, 12, 14, 16 and 18, arranged in a generally two-dimensional array, such as a shelf assembly 20.

The device preferably includes an illuminator 22, preferably comprising a linear array 24 of LEDs, such as an LED array commercially available from Norlux Corporation, 575 Randy Road, Carol Stream, Ill., USA, disposed above a cylindrical lens 26. It is a particular feature of the present invention that the illuminator 22 is disposed adjacent an edge 28 of shelf assembly 20 and generates radiation which illuminates a generally planar imaginary curtain, collectively designated by arrows 30, disposed in front of the shelf assembly 20, including, inter alia, bins 10, 12, 14, 16 and 18.

At least one detector, preferably two detectors 32 and 34, are disposed adjacent edge 28 and sense radiation, indicated by arrows 36, reflected from a hand traversing the imaginary curtain 30, generally at any location on the curtain. It is appreciated that radiation 36 originates as radiation, preferably in the non-visible infrared spectrum, from illuminator 22 and is reflected by a person's hand when it traverses the imaginary curtain 30. In the illustrated embodiment of the invention, wherein two detectors 32 and 34 are employed, the detectors 32 and 34 are configured to sense the direction from which the reflected light is received. Preferred detectors useful for this application are described in detail in applicant/assignee's U.S. patent application Ser. No. 11/360,853, filed Feb. 23, 2006, entitled INPUT DEVICE, the disclosure of which is hereby incorporated by reference, and in applicant/assignee's U.S. Provisional Patent Application 60/819,891, filed Jul. 12, 2006, entitled LOW PROFILE TRIANGULATION AND SYSTEMS CALIBRATION METHOD, the disclosure of which is hereby incorporated by reference.

Location determination circuitry 40 is responsive to the direction-indicating outputs of detectors 32 and 34 for determining the location of the hand, from which the light is reflected to detectors 32 and 34, and also associates a sensed position of the hand with respect to one of the bins, such as bins 10, 12, 14, 16 and 18, in shelf assembly 20. In FIG. 1 location determination circuitry 40 indicates that the hand is in propinquity to bin 14 and provides this information to a remote server 42 via any suitable computer network, such as the Internet. In an alternative embodiment of the present invention, coordinates of the location of the hand with respect to the detectors 32 and 34 are provided to remote server 42 by location determination circuitry 40 and the server 42 determines that the hand is in propinquity to bin 14.

Once a determination is made that the hand is in propinquity to a given bin, server 42 determines whether the position of the hand is in error, i.e. that an incorrect bin is being accessed by a user. Server 42 preferably includes error notification circuitry responsive to at least one input indicating a correct bin to be accessed and is also responsive to the output of location determining circuitry 40, indicating that the hand is in propinquity to a given bin. In the event of a mismatch between the correct bin to be accessed and the bin determined by the output of location determination circuitry 40, an alarm indication may be provided from server 42 to an error alarm indicator 44, such as a visual and/or audio indicator, to inform the user of the error and enable the user to correct the error in real time.

In a preferred embodiment of the present invention, curtain limiting barriers 46 may be provided along one or more edge of the shelf assembly 20 in order to limit or eliminate possible cross-talk with similar devices on adjacent shelf assemblies and to prevent false detections. Alternatively, the barriers 46 may be eliminated.

It is appreciated that although triangulation is employed in the illustrated embodiment of FIG. 1, the system of FIG. 1 may be implemented using alternative location detection functionality, such as confocal detection, typically employing a 2-dimensional CMOS camera, as described in applicant/assignee's U.S. patent application Ser. No. 11/360,853, filed Feb. 23, 2006, entitled INPUT DEVICE, the disclosure of which is hereby incorporated by reference, and relative intensity position measurement employing discrete photodiodes, as described in applicant/assignee's U.S. Provisional Patent Application 60/811,395, filed Jun. 7, 2006, entitled POSITION MEASUREMENT, the disclosure of which is hereby incorporated by reference.

Figure 2:
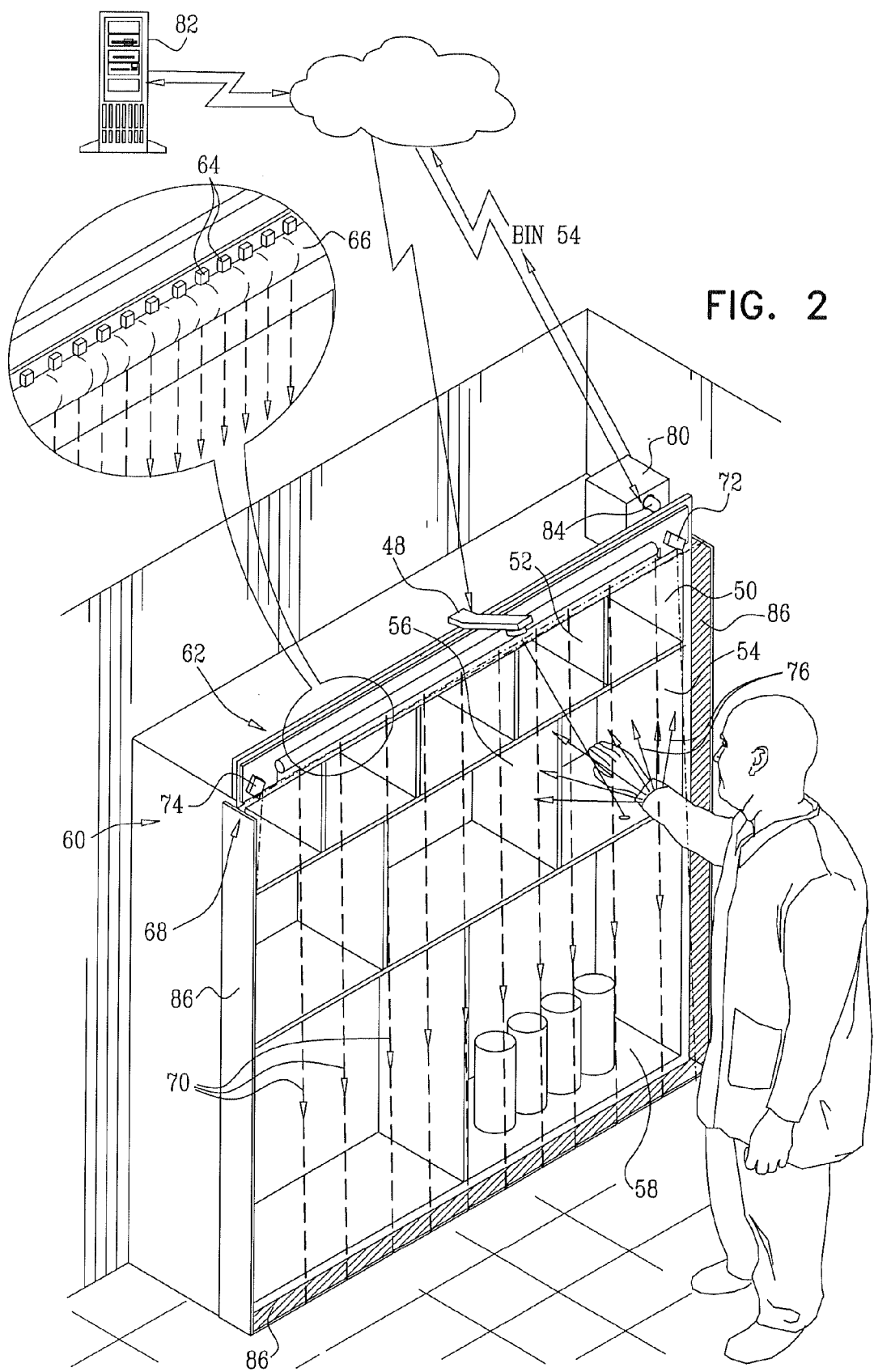
FIG. 2 is a simplified illustration of a hand propinquity monitoring device constructed and operative in accordance with another preferred embodiment of the present invention.

Reference is now made to FIG. 2, which is a simplified illustration of a hand propinquity monitoring device constructed and operative in accordance with a preferred embodiment of the present invention, particularly useful in error-proofing applications. As seen in FIG. 2, there is provided a selectable indicator 48, preferably a two-axis laser scanner, such as a Superscan-SC commercially available from Raylase AG, Argelsrieder Feld 2+4, D-82234, Wessling, Germany, for visibly designating a currently correct one of plural adjacent item locations, such as bins 50, 52, 54, 56 and 58, as well as a device for monitoring hand propinquity to plural adjacent item locations, such as bins 50, 52, 54, 56 and 58, arranged in a generally two-dimensional array, such as a shelf assembly 60.

The monitoring device preferably includes an illuminator 62, preferably comprising a linear array 64 of LEDs, such as an LED array commercially available from Norlux Corporation, 575 Randy Road, Carol Stream, Ill., USA, disposed above a cylindrical lens 66. It is a particular feature of the present invention that the illuminator 62 is disposed adjacent an edge 68 of shelf assembly 60 and generates radiation which illuminates a generally planar imaginary curtain, collectively designated by arrows 70, disposed in front of the shelf assembly 60, including, inter alia, bins 50, 52, 54, 56 and 58.

At least one detector, preferably two detectors 72 and 74, are disposed adjacent edge 68 and sense radiation, indicated by arrows 76, reflected from a hand traversing the imaginary curtain 70, generally at any location on the curtain. It is appreciated that radiation 76 originates as radiation, preferably in the non-visible infrared spectrum, from illuminator 62 and is reflected by a person's hand when it traverses the imaginary curtain 70. In the illustrated embodiment of the invention, wherein two detectors 72 and 74 are employed, the detectors 72 and 74 are configured to sense the direction from which the reflected light is received. Preferred detectors useful for this application are described in detail in applicant/assignee's U.S. patent application Ser. No. 11/360,853, filed Feb. 23, 2006, entitled INPUT DEVICE, the disclosure of which is hereby incorporated by reference and in applicant/assignee's U.S. Provisional Patent Application 60/819,891, filed Jul. 12, 2006, entitled LOW PROFILE TRIANGULATION AND SYSTEMS CALIBRATION METHOD, the disclosure of which is hereby incorporated by reference.

Location determination circuitry 80 is responsive to the direction-indicating outputs of detectors 72 and 74 for determining the location of the hand, from which the light is reflected to detectors 72 and 74, and also associates a sensed position of the hand with respect to one of the bins, such as bins 50, 52, 54, 56 and 58, in shelf assembly 60. In FIG. 2, location determination circuitry 80 indicates that the hand is in propinquity to bin 54 and provides this information to a remote server 82 via any suitable computer network, such as the Internet. In an alternative embodiment of the present invention, coordinates of the location of the hand with respect to the detectors 72 and 74 are provided to remote server 82 by location determination circuitry 80 and the server 82 determines that the hand is in propinquity to bin 54.

In operation, server 82 typically provides a suitable bin selection signal to selectable indicator 48, which indicates to a user which bin to access at a given time. Once a determination is made that the hand is in propinquity to a given bin, server 82 determines whether the position of the hand is in error, i.e. that an incorrect bin is being accessed by a user. Server 82 preferably includes error notification circuitry responsive to at least one input indicating a correct bin to be accessed and is also responsive to the output of location determining circuitry 80, indicating that the hand is in propinquity to a given bin. In the event of a mismatch between the correct bin to be accessed and the bin determined by the output of location determination circuitry 80, an alarm indication may be provided from server 82 to an error alarm indicator 84, such as a visual and/or audio indicator, to inform the user of the error and enable the user to correct the error in real time.

In a preferred embodiment of the present invention, curtain limiting barriers 86 may be provided along one or more edge of the shelf assembly 60 in order to limit or eliminate possible cross-talk with similar devices on adjacent shelf assemblies and to prevent false detections. Alternatively, the barriers 86 may be eliminated.

It is appreciated that although triangulation is employed in the illustrated embodiment of FIG. 2, the system of FIG. 2 may be implemented using alternative location detection functionality, such as confocal detection, typically employing a 2-dimensional CMOS camera, as described in applicant/assignee's U.S. patent application Ser. No. 11/360,853, filed Feb. 23, 2006, entitled INPUT DEVICE, the disclosure of which is hereby incorporated by reference, and relative intensity position measurement employing discrete photodiodes, as described in applicant/assignee's U.S. Provisional Patent Application 60/811,395, filed Jun. 7, 2006, entitled POSITION MEASUREMENT, the disclosure of which is hereby incorporated by reference.

Figure 3:
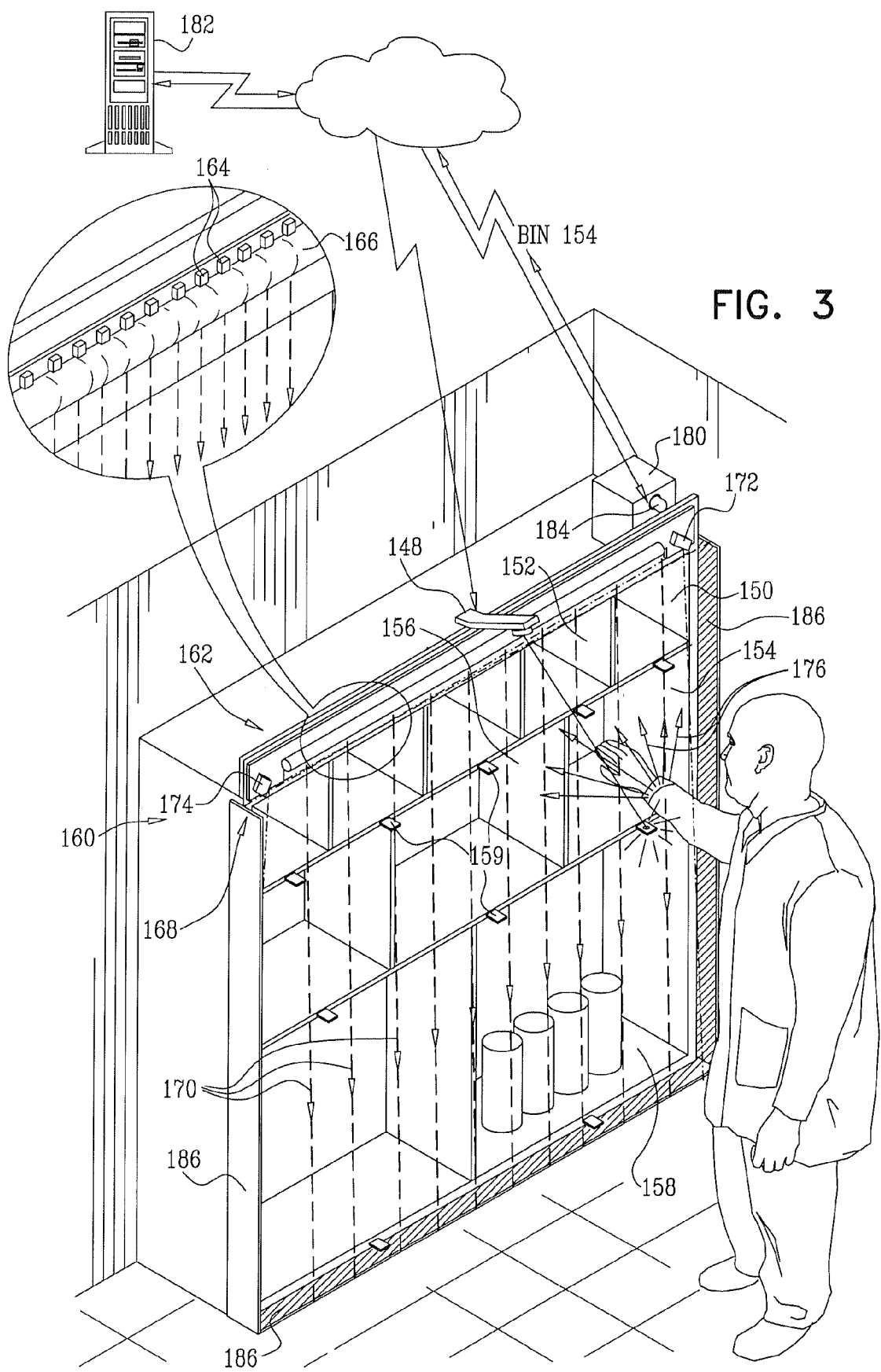
FIG. 3 is a simplified illustration of a hand propinquity monitoring device constructed and operative in accordance with yet another preferred embodiment of the present invention.

Reference is now made to FIG. 3, which is a simplified illustration of a hand propinquity monitoring device constructed and operative in accordance with a preferred embodiment of the present invention, particularly useful in error-proofing applications. As seen in FIG. 3, there is provided a selectable indicator 148, preferably a single-axis laser scanner, such as a 6200H scanner commercially available from Cambridge Technology, Inc., 109 Smith Place, Cambridge, Mass., USA, for visibly designating a currently correct one of plural adjacent item locations, such as bins 150, 152, 154, 156 and 158, by selectably illuminating a corresponding one of plural protruding tags 159 located adjacent each of the plural adjacent item locations. It is noted that the positioning of tags 159 should be such that no two tags 159 lie in along the same line of sight from indicator 148.

The device of FIG. 3 also includes a device for monitoring hand propinquity to plural adjacent item locations, such as bins 150, 152, 154, 156 and 158, arranged in a generally two-dimensional array, such as a shelf assembly 160.

The monitoring device preferably includes an illuminator 162, preferably comprising a linear array 164 of LEDs, such as an LED array commercially available from Norlux Corporation, 575 Randy Road, Carol Stream, Ill., USA, disposed above a cylindrical lens 166. It is a particular feature of the present invention that the illuminator 162 is disposed adjacent an edge 168 of shelf assembly 160 and generates radiation which illuminates a generally planar imaginary curtain, collectively designated by arrows 170, disposed in front of the shelf assembly 160, including, inter alia, bins 150, 152, 154, 156 and 158.

At least one detector, preferably two detectors 172 and 174, are disposed adjacent edge 168 and sense radiation, indicated by arrows 176, reflected from a hand traversing the imaginary curtain 170, generally at any location on the curtain. It is appreciated that radiation 176 originates as radiation, preferably in the non-visible infrared spectrum, from illuminator 162 and is reflected by a person's hand when it traverses the imaginary curtain 170. In the illustrated embodiment of the invention, wherein two detectors 172 and 174 are employed, the detectors 172 and 174 are configured to sense the direction from which the reflected light is received. Preferred detectors useful for this application are described in detail in applicant/assignee's U.S. patent application Ser. No. 11/360,853, filed Feb. 23, 2006, entitled INPUT DEVICE, the disclosure of which is hereby incorporated by reference and in applicant/assignee's U.S. Provisional Patent Application 60/819,891, filed Jul. 12, 2006, entitled LOW PROFILE TRIANGULATION AND SYSTEMS CALIBRATION METHOD, the disclosure of which is hereby incorporated by reference.

Location determination circuitry 180 is responsive to the direction-indicating outputs of detectors 172 and 174 for determining the location of the hand, from which the light is reflected to detectors 172 and 174 and also associates a sensed position of the hand with respect to one of the bins, such as bins 150, 152, 154, 156 and 158, in shelf assembly 160. In FIG. 3, location determination circuitry 180 indicates that the hand is in propinquity to bin 154 and provides this information to a remote server 182 via any suitable computer network, such as the Internet. In an alternative embodiment of the present invention, coordinates of the location of the hand with respect to the detectors 172 and 174 are provided to remote server 182 by location determination circuitry 180 and the server 182 determines that the hand is in propinquity to bin 154.

In operation, server 182 typically provides a suitable bin selection signal to selectable indicator 148, which indicates to a user which bin to access at a given time. Once a determination is made that the hand is in propinquity to a given bin, server 182 determines whether the position of the hand is in error, i.e. that an incorrect bin is being accessed by a user. Server 182 preferably includes error notification circuitry responsive to at least one input indicating a correct bin to be accessed and is also responsive to the output of location determining circuitry 180, indicating that the hand is in propinquity to a given bin. In the event of a mismatch between the correct bin to be accessed and the bin determined by the output of location determination circuitry 180, an alarm indication may be provided from server 182 to an error alarm indicator 184, such as a visual and/or audio indicator, to inform the user of the error and enable the user to correct the error in real time.

In a preferred embodiment of the present invention, curtain limiting barriers 186 may be provided along one or more edge of the shelf assembly 160 in order to limit or eliminate possible cross-talk with similar devices on adjacent shelf assemblies and to prevent false detections. Alternatively, the barriers 186 may be eliminated.

It is appreciated that although triangulation is employed in the illustrated embodiment of FIG. 3, the system of FIG. 3 may be implemented using alternative location detection functionality, such as confocal detection, typically employing a 2-dimensional CMOS camera, as described in applicant/assignee's U.S. patent application Ser. No. 11/360,853, filed Feb. 23, 2006, entitled INPUT DEVICE, the disclosure of which is hereby incorporated by reference, and relative intensity position measurement, employing discrete photo-diodes, as described in applicant/assignee's U.S. Provisional Patent Application 60/811,395, filed Jun. 7, 2006, entitled POSITION MEASUREMENT, the disclosure of which is hereby incorporated by reference.

Figure 4A:
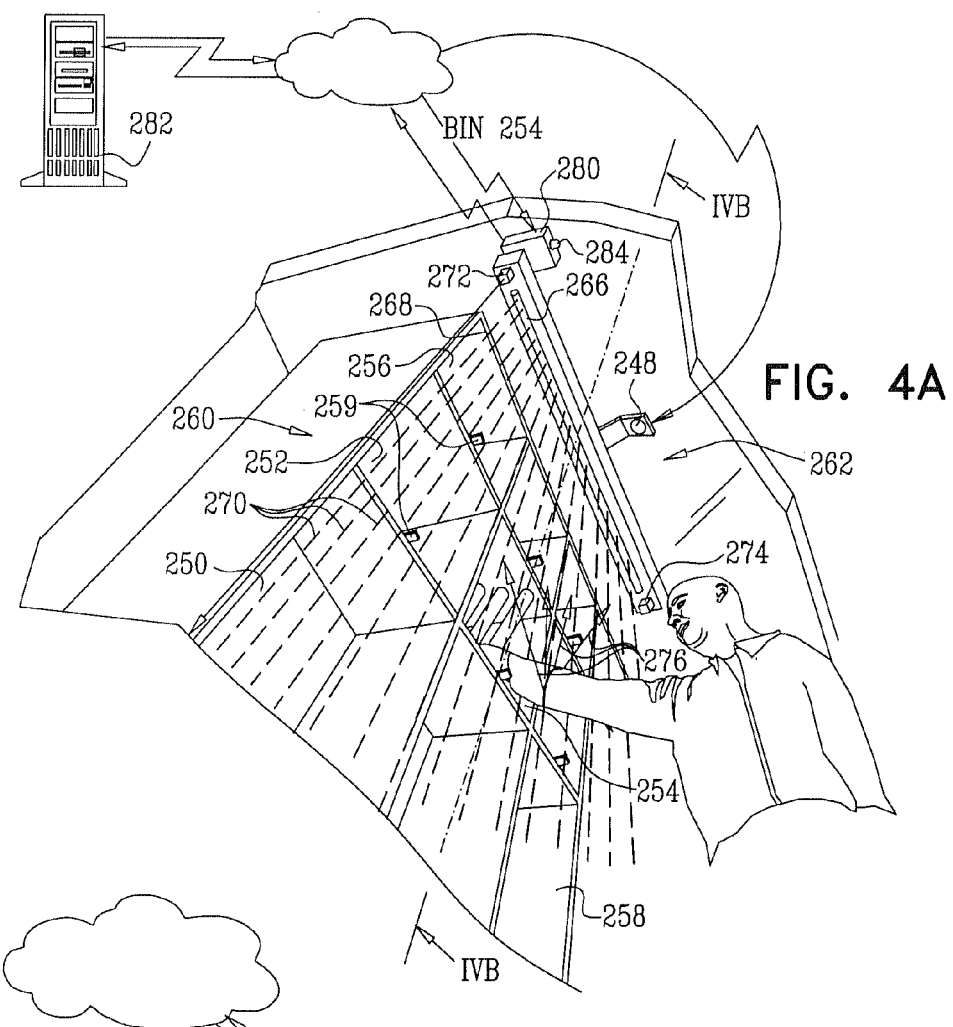
FIGS. 4A & 4B are respective perspective and sectional illustrations of a hand propinquity monitoring device constructed and operative in accordance with still another preferred embodiment of the present invention, FIG. 4B, being taken along lines IVB-IVB in FIG. 4A.
Figure 4B:
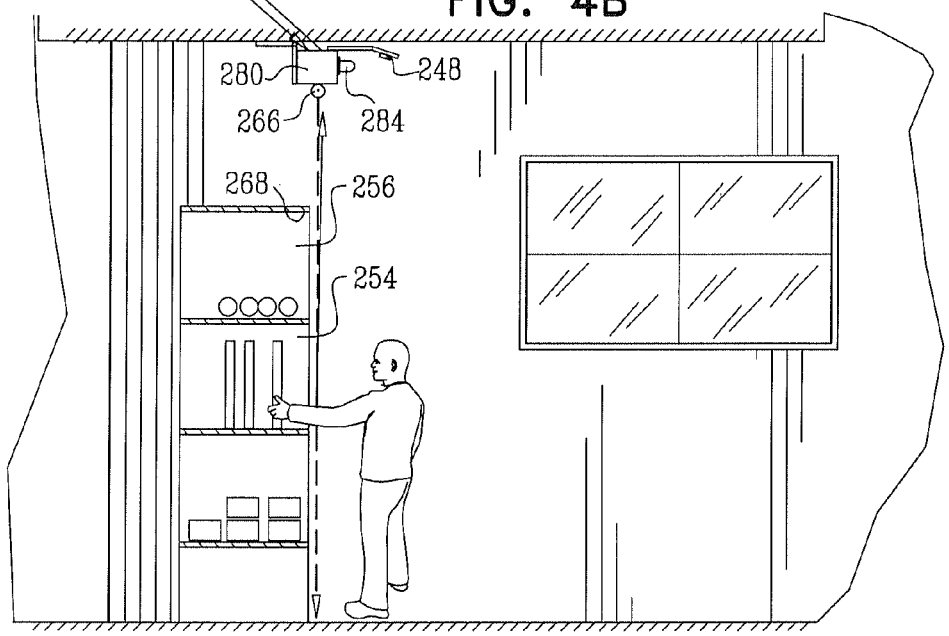

Reference is now made to FIGS. 4A & 4B, which are respective perspective and sectional illustrations of a hand propinquity monitoring device constructed and operative in accordance with still another preferred embodiment of the present invention.

As seen in FIGS. 4A & 4B, there is provided a selectable indicator 248, preferably a single-axis laser scanner, such as a 6200H scanner commercially available from Cambridge Technology, Inc., 109 Smith Place, Cambridge, Mass., USA, for visibly designating a currently correct one of plural adjacent item locations, such as bins 250, 252, 254, 256 and 258, by selectably illuminating a corresponding one of plural protruding tags 259 located adjacent each of the plural adjacent item locations. It is noted that the positioning of tags 259 should be such that no two tags 259 lie in along the same line of sight from indicator 248. Alternatively, a two-axis laser scanner may be employed as the selectable indicator 248, thereby obviating the need for protruding tags 259.

The device of FIGS. 4A & 4B also includes a device for monitoring hand propinquity to plural adjacent item locations, such as bins 250, 252, 254, 256 and 258, arranged in a generally two-dimensional array, such as a shelf assembly 260.

The monitoring device preferably includes an illuminator 262, preferably comprising a linear array of LEDs (not shown), such as an LED array commercially available from Norlux Corporation, 575 Randy Road, Carol Stream, Ill., USA, disposed above a cylindrical lens 266. It is a particular feature of the present invention that the illuminator 262 is disposed adjacent an edge 268 of shelf assembly 260 and generates radiation which illuminates a generally planar imaginary curtain, collectively designated by arrows 270, disposed in front of the shelf assembly 260, including, inter alia, bins 250, 252, 254, 256 and 258.

At least one detector 272, preferably two detectors 272 and 274, are disposed adjacent edge 268 and sense radiation, indicated by arrows 276, reflected from a hand traversing the imaginary curtain 270, generally at any location on the curtain. It is appreciated that radiation 276 originates as radiation, preferably in the non-visible infra-red spectrum, from illuminator 262 and is reflected by a person's hand when it traverses the imaginary curtain 270. In the illustrated embodiment of the invention, wherein two detectors 272 and 274 are employed, the detectors 272 and 274 are configured to sense the direction from which the reflected light is received. Preferred detectors useful for this application are described in detail in applicant/assignee's U.S. patent application Ser. No. 11/360,853, filed Feb. 23, 2006, entitled INPUT DEVICE, the disclosure of which is hereby incorporated by reference, and in applicant/assignee's U.S. Provisional Patent Application 60/819,891, filed Jul. 12, 2006, entitled LOW PROFILE TRIANGULATION AND SYSTEMS CALIBRATION METHOD, the disclosure of which is hereby incorporated by reference.

Location determination circuitry 280 is responsive to the direction-indicating outputs of detectors 272 and 274 for determining the location of the hand, from which the light is reflected to detectors 272 and 274, and also associates a sensed position of the hand with respect to one of the bins, such as bins 250, 252, 254, 256 and 258, in shelf assembly 260. In FIGS. 4A & 4B location determination circuitry 280 indicates that the hand is in propinquity to bin 254 and provides this information to a remote server 282 via any suitable computer network, such as the Internet. In an alternative embodiment of the present invention, coordinates of the location of the hand with respect to the detectors 272 and 274 are provided to remote server 282 by location determination circuitry 280 and the server 282 determines that the hand is in propinquity to bin 254.

In the illustrated embodiment of FIGS. 4A & 4B, the monitoring device and the selectable indicating device are preferably located on a ceiling of a room in which the shelf assembly 260 is located, adjacent to edge 268 of the shelf assembly.

In operation, server 282 typically provides a suitable bin selection signal to selectable indicator 248, which indicates to a user, which bin to access at a given time. Once a determination is made that the hand is in propinquity to a given bin, server 282 determines whether the position of the hand is in error, i.e. that an incorrect bin is being accessed by a user. Server 282 preferably includes error notification circuitry responsive to at least one input indicating a correct bin to be accessed and is also responsive to the output of location determining circuitry 280, indicating that the hand is in propinquity to a given bin. In the event of a mismatch between the correct bin to be accessed and the bin determined by the output of location determination circuitry 280, an alarm indication may be provided from server 282 to an error alarm indicator 284, such as a visual and/or audio indicator, to inform the user of the error and enable the user to correct the error in real time.

In a preferred embodiment of the present invention, curtain limiting barriers (not shown) may be provided along one or more edge of the shelf assembly 260 in order to limit or eliminate possible cross-talk with similar devices on adjacent shelf assemblies and to prevent false detections. Alternatively, the barriers may be eliminated.

It is appreciated that although triangulation is employed in the illustrated embodiment of FIGS. 4A & 4B, the system of FIGS. 4A & 4B may be implemented using alternative location detection functionality, such as confocal detection, typically employing a 2-dimensional CMOS camera, as described in applicant/assignee's U.S. patent application Ser. No. 11/360,853, filed Feb. 23, 2006, entitled INPUT DEVICE, the disclosure of which is hereby incorporated by reference, and relative intensity position measurement employing discrete photo-diodes, as described in applicant/assignee's U.S. Provisional Patent Application 60/811,395, filed Jun. 7, 2006, entitled POSITION MEASUREMENT, the disclosure of which is hereby incorporated by reference.

It will be appreciated by persons skilled in the art that the present invention is not limited by what has been particularly shown and described hereinabove. Rather the scope of the present invention includes both combinations and sub-combinations of features recited in the claims as well as modifications thereof which would occur to a person of ordinary skill in the art upon reading the foregoing and which are not in the prior art.

The invention claimed is:

1. Apparatus for monitoring hand propinquity to plural adjacent item locations arranged in a generally two-dimensional array comprising:
   an illuminator, disposed adjacent a first edge of said two-dimensional array and generating radiation which illuminates a generally planar imaginary curtain disposed in front of said plural adjacent item locations;
   at least one detector, disposed adjacent said first edge of said array and alongside said illuminator, and sensing said radiation reflected from a hand traversing said imaginary curtain generally at any location on said curtain; and
   location determination circuitry responsive to at least one output of said at least one detector for associating a sensed position of said hand with respect to one of said plural adjacent item locations.

2. Apparatus for monitoring hand propinquity to plural adjacent item locations arranged in a generally two dimensional array according to claim 1 and also comprising:
   error notification circuitry responsive to at least one input indicating a correct one of said plural adjacent item locations to be accessed by said hand and also responsive to an output from said location determination circuitry, indicating said sensed position of said hand with respect to one of said plural adjacent item locations, for providing a sensible indication of a mismatch between said correct one of said plural adjacent item locations to be accessed by said hand and said sensed position of said hand with respect to one of said plural adjacent item locations.

3. Apparatus for monitoring hand propinquity to plural adjacent item locations arranged in a generally two dimensional array according to claim 2 and also comprising at least one item location designator providing a visually sensible indication indicating said correct one of said plural adjacent item locations to be accessed by said hand.

4. Apparatus for monitoring hand propinquity to plural adjacent item locations arranged in a generally two dimensional array according to claim 1 and also comprising at least one item location designator providing a visually sensible indication indicating a correct one of said plural adjacent item locations to be accessed by said hand.

5. Apparatus for monitoring hand propinquity to plural adjacent item locations arranged in a generally two dimensional array according to claim 1 and wherein said at least one detector comprises at least two detectors and said location determination circuitry is operative in a triangulation mode of operation.

6. Apparatus for monitoring hand propinquity to plural adjacent item locations arranged in a generally two dimensional array according to claim 1 and wherein said at least one detector comprises a 2-dimensional CMOS camera and said location determination circuitry is operative in a confocal detection mode of operation.

7. Apparatus for monitoring hand propinquity to plural adjacent item locations arranged in a generally two dimensional array according to claim 1 and wherein said at least one detector comprises at least two photo-diodes and said location determination circuitry is operative in a relative intensity position measurement mode of operation.

8. Apparatus for monitoring hand propinquity to plural adjacent item locations arranged in a generally two dimensional array according to claim 1 and wherein said location determination circuitry is operative to provide an output indicating that said hand is in propinquity to a specific one of said plural adjacent item locations.

9. Apparatus for monitoring hand propinquity to plural adjacent item locations arranged in a generally two dimensional array according to claim 1 and wherein said location determination circuitry is operative to calculate the coordinates of the location of said hand with respect to said at least one detector.

10. Apparatus for monitoring hand propinquity to plural adjacent item locations arranged in a generally two dimensional array according to claim 1 and also comprising at least one barrier operative to limit possible cross-talk with similar devices.

11. A method for monitoring hand propinquity to plural adjacent item locations arranged in a generally two-dimensional array, the method comprising:
    using an illuminator for generating radiation which forms a generally planar imaginary curtain disposed in front of said plural adjacent item locations;
    using at least one detector alongside said illuminator for sensing said radiation reflected from a hand traversing said imaginary curtain generally at any location on said curtain; and
    associating a sensed position of said hand with respect to one of said plural adjacent item locations based on said sensing.

12. A method for monitoring hand propinquity to plural adjacent item locations arranged in a generally two dimensional array according to claim 11 and also comprising:
    providing at least one input indicating a correct one of said plural adjacent item locations to be accessed by said hand; and
    providing a sensible indication of a mismatch between said correct one of said plural adjacent item locations to be accessed by said hand and said sensed position of said hand with respect to one of said plural adjacent item locations.

13. A method for monitoring hand propinquity to plural adjacent item locations arranged in a generally two dimensional array according to claim 12 and also comprising providing a visually sensible indication indicating said correct one of said plural adjacent item locations to be accessed by said hand.

14. A method for monitoring hand propinquity to plural adjacent item locations arranged in a generally two dimensional array according to claim 11 and also comprising providing a visually sensible indication indicating a correct one of said plural adjacent item locations to be accessed by said hand.

15. A method for monitoring hand propinquity to plural adjacent item locations arranged in a generally two dimensional array according to claim 11 and wherein said associating comprises calculating said sensed position by triangulation.

16. A method for monitoring hand propinquity to plural adjacent item locations arranged in a generally two dimensional array according to claim 11 and wherein said associating comprises calculating said sensed position using confocal detection.

17. A method for monitoring hand propinquity to plural adjacent item locations arranged in a generally two dimensional array according to claim 11 and wherein said associating comprises calculating said sensed position using relative intensity position measurement.

18. A method for monitoring hand propinquity to plural adjacent item locations arranged in a generally two dimensional array according to claim 11 and wherein said asso ciating comprises indicating that said hand is in propinquity to a specific one of said plural adjacent item locations.

19. A method for monitoring hand propinquity to plural adjacent item locations arranged in a generally two dimensional array according to claim 11 and wherein said associating comprises calculating coordinates of the location of said hand with respect to said plural adjacent item locations.

20. A method for monitoring hand propinquity to plural adjacent item locations arranged in a generally two dimensional array according to claim 11 and also comprising providing at least one barrier operative to limit possible cross-talk with similar devices.

* * * * *